United States Patent
Chen et al.

(10) Patent No.: US 10,339,355 B2
(45) Date of Patent: Jul. 2, 2019

(54) FINGERPRINT SENSING CIRCUIT, ELECTRONIC DEVICE AND METHOD FOR PROCESSING FINGERPRINT IMAGE

(71) Applicant: HIMAX TECHNOLOGIES LIMITED, Tainan (TW)

(72) Inventors: Shing-Chia Chen, Tainan (TW); Yaw-Guang Chang, Tainan (TW); Wei-Ting Suen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 121 days.

(21) Appl. No.: 15/456,572

(22) Filed: Mar. 12, 2017

(65) Prior Publication Data

US 2018/0260599 A1    Sep. 13, 2018

(51) Int. Cl.
*G06K 9/00* (2006.01)
(52) U.S. Cl.
CPC .................. *G06K 9/0002* (2013.01)
(58) Field of Classification Search
CPC .................. G06K 9/0002; G06K 9/00087
USPC .................................................. 382/124
See application file for complete search history.

(56) References Cited

U.S. PATENT DOCUMENTS

| | | | |
|---|---|---|---|
| 2016/0227142 A1* | 8/2016 | Lin | G06K 9/00013 |
| 2016/0350577 A1* | 12/2016 | Yang | G06K 9/0002 |
| 2017/0046551 A1 | 2/2017 | Lee | |
| 2017/0206394 A1 | 7/2017 | Chiang et al. | |

FOREIGN PATENT DOCUMENTS

| | | |
|---|---|---|
| TW | M517829 U | 2/2016 |
| TW | 201727461 A | 8/2017 |

* cited by examiner

*Primary Examiner* — Amandeep Saini
(74) *Attorney, Agent, or Firm* — CKC & Partners Co., LLC

(57) ABSTRACT

The fingerprint sensing circuit includes sensing units and a sensing circuit. The sensing units are arranged as columns and rows. Each of the sensing units includes a sensing electrode. The sensing circuit is electrically connected to the sensing electrodes in at least two first sensing units of the sensing units in a first period to obtain a first fingerprint grey level.

2 Claims, 6 Drawing Sheets

FINGERPRINT SENSING CIRCUIT, ELECTRONIC DEVICE AND METHOD FOR PROCESSING FINGERPRINT IMAGE

BACKGROUND

Field of Invention

The present invention relates to a fingerprint sensing circuit, an electronic device and a method for processing a fingerprint image.

Description of Related Art

Human fingerprints are detailed, nearly unique, difficult to alter, and durable over the life of an individual, making them suitable as long-term markers of human identity. In general, a fingerprint sensing circuit includes multiple sensing electrodes arranged as a matrix. A fingerprint image is generated by the capacitance difference between the sensing electrodes and a human finger for identifying ridges and valleys on the human finger. One or ore insulation layer is disposed between the sensing electrodes and the finger, and when the insulation layer is very thick, it's hard to identify the ridges and the valleys. On the other hand, the identification ability is improved when the area of the sensing electrode is increased, but it will also increase the area of the circuit or reduce the resolution of the fingerprint image. It is an issue in the art about how to provide better fingerprint image under the hardware limitations.

SUMMARY

Embodiments of the present invention provide a fingerprint sensing circuit including sensing units and a sensing circuit. The sensing units are arranged as columns and rows. Each of the sensing units includes a sensing electrode. The sensing circuit is electrically connected to the sensing electrodes in at least two first sensing units of the sensing units in a first period to obtain a first fingerprint grey level.

In some embodiments, after obtaining the first fingerprint grey level, the sensing circuit is electrically connected to the sensing electrodes in at least two second sensing units of the sensing units in a second period to obtain a second fingerprint grey level. Part of the second sensing units is identical to part of the first sensing units.

In some embodiments, the number of the first sensing units is equal to 4, and the number of the second sensing units is equal to 4. The first sensing units and the second sensing units are arranged in a first row and a second row of the rows. The first sensing units are arranged in a first column and a second column of the columns. The second sensing units are arranged in the second column and a third column of the columns.

In some embodiments, each of the sensing units further includes a transfer switch having a first terminal, a second terminal and a control terminal. The first terminal of the transfer switch is connected to the respective sensing electrode. The fingerprint sensing circuit further includes first conductive lines and second conductive lines. The first conductive lines are respectively corresponding to the rows. Each of the first conductive lines is electrically connected to the control terminals of the transfer switches in one of the rows. The second conductive lines are respectively corresponding to the columns and electrically connected to the sensing circuit. Each of the second conductive lines is electrically connected to the second terminals of the transfer switches in one of the columns.

In some embodiments, the fingerprint sensing circuit further includes column switches, a row select circuit and a column select circuit. The column switches are respectively disposed on the second conductive lines and disposed between the sensing units and the sensing circuit. The row select circuit transmits a first signal to the first conductive lines corresponding to the first row and the second row in the first period for turning on the transfer switches in the first row and the second row. The column select circuit turns on the column switches corresponding to the first column and the second column in the first period.

In some embodiments, the row select circuit transmits the first signal to the first conductive lines corresponding to the first row and the second row in the second period to turn on the transfer switches in the first row and the second row. The column select circuit turns on the column switches corresponding to the second column and the third column in the second period.

From another aspect, embodiments of the present invention provide a method for processing a fingerprint image for an electronic device including a fingerprint sensing circuit. The fingerprint sensing circuit includes sensing units, and each of the sensing units includes a sensing electrode. The method includes: receiving fingerprint grey levels from the fingerprint sensing circuit, in which the fingerprint grey levels are respectively corresponding to the sensing units; and performing weighting summation on first fingerprint grey levels of the fingerprint grey levels to obtain a first new fingerprint grey level to replace one of the first fingerprint grey levels.

In some embodiments, the method further includes: performing the weighting summation on second fingerprint grey levels of the fingerprint grey levels to obtain a second new fingerprint grey level to replace one of the second fingerprint grey levels, in which part of the first fingerprint grey levels is identical to part of the second fingerprint grey levels.

In some embodiments, the number of the first fingerprint grey levels is equal to 4, the number of the second fingerprint grey levels is equal to 4, and two of the first fingerprint grey levels are identical to two of the second fingerprint grey levels respectively.

In some embodiments, the sensing units are arranged as columns and rows, the first fingerprint grey levels are corresponding to first sensing units of the sensing units, and the second fingerprint grey levels are corresponding to second sensing units of the sensing units. The first sensing units and the second sensing units are arranged in a first row and a second row of the rows. The first sensing units are arranged in a first column and a second column of the columns. The second sensing units are arranged in the second column and a third column of the columns.

From another aspect, embodiments of the present invention provide an electronic device including a fingerprint sensing circuit. The fingerprint sensing circuit includes sensing units and a sensing circuit. The sensing units are arranged as columns and rows, and each of the sensing units includes a sensing electrode. The sensing circuit is electrically connected to the sensing electrodes in at least two first sensing units of the sensing units in a first period to obtain a first fingerprint grey level.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
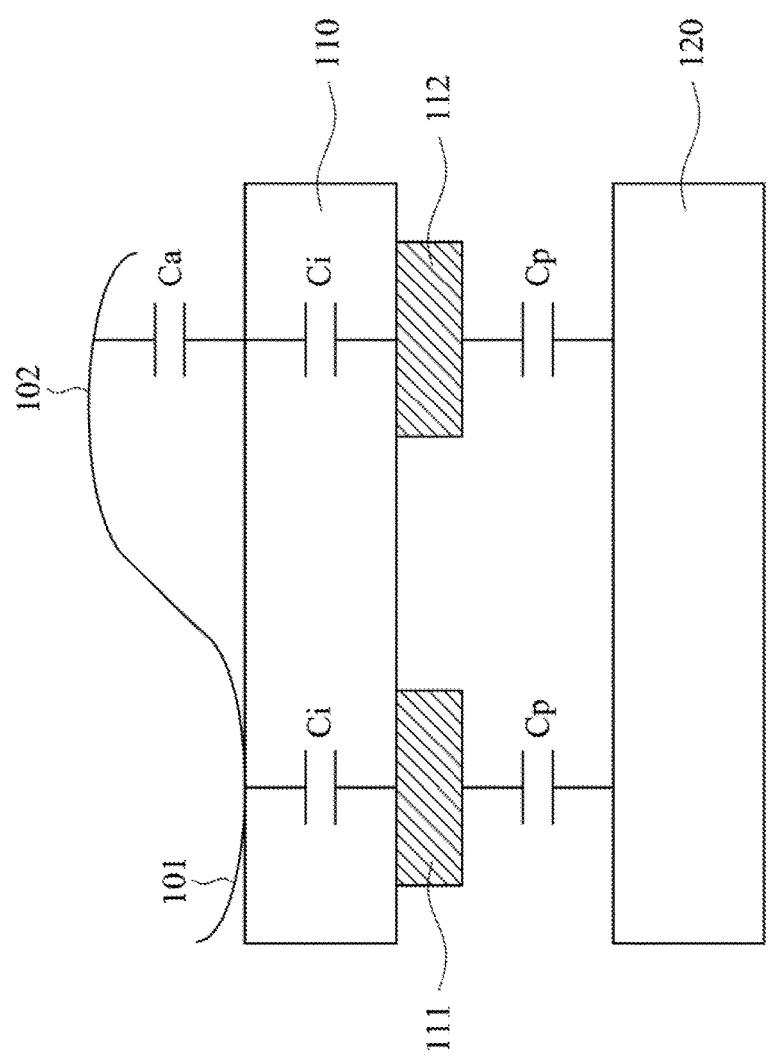
FIG. 1 is a schematic diagram illustrating capacitive print sensing according to an embodiment.

FIG. 1 is a schematic diagram illustrating capacitive fingerprint sensing according to an embodiment. Referring to FIG. 1, a human finger has a ridge 101 and a valley 102. A top surface of a protection layer 110 (may be referred to an insulation layer) faces the user, and sensing electrodes 111 and 112 are disposed on a bottom surface of the protection layer 110. When the finger touches the protection layer 110, the distance between the ridge 101 and the top surface of the protection layer 110 is relatively shorter, and the distance between the valley 102 and the top surface of the protection layer 110 is relatively longer. A capacitor $C_i$ is formed between the ridge 101 and the sensing electrode 111, and capacitors $C_i$ and $C_a$ connected in series are formed between the valley 102 and the sensing electrode 112. In addition, capacitors $C_p$ are formed between the sensing electrodes 111-112 and a substrate 120. Therefore, the capacitance measured on the sensing electrode 111 is $C_p + C_i$, and the capacitance measured on the sensing electrode 112 is $C_p + C_i \| C_a$. The ridge 101 and the valley 102 are identified by identifying the two capacitances. In general, the larger the difference between the two capacitances is, the easier it is to identify the ridge 101 and, the valley 102. Assume the areas of the sensing electrodes 111 and 112 are the same (denoted as A below), the thickness of the protection layer 110 is $d_i$, the distance between the valley 102 and the protection layer 110 is $d_a$, the dielectric coefficient of the protection layer 110 is $\varepsilon_i$, the dielectric coefficient of air is $\varepsilon_0$, and then the difference between the two capacitances is written in following equation (1).

$$C_i - C_a \| C_i = \frac{\varepsilon_i A}{d_i} - \frac{\varepsilon_0 \varepsilon_i A}{d_i \varepsilon_0 + d_a \varepsilon_i} = \varepsilon_i A \left( \frac{d_a \varepsilon_i}{d_i (d_i \varepsilon_0 + d_a \varepsilon_i)} \right) \quad (1)$$

As shown in the equation (1), the larger the area A is, the larger the capacitance difference is, and thus the identification ability gets better; and the larger the thickness $d_i$ is, the smaller the capacitance difference is, and thus the identification ability gets worse. A fingerprint sensing circuit is provided in the disclosure which is capable of improving the identification ability without altering the area A and the thickness $d_i$.

Figure 2:
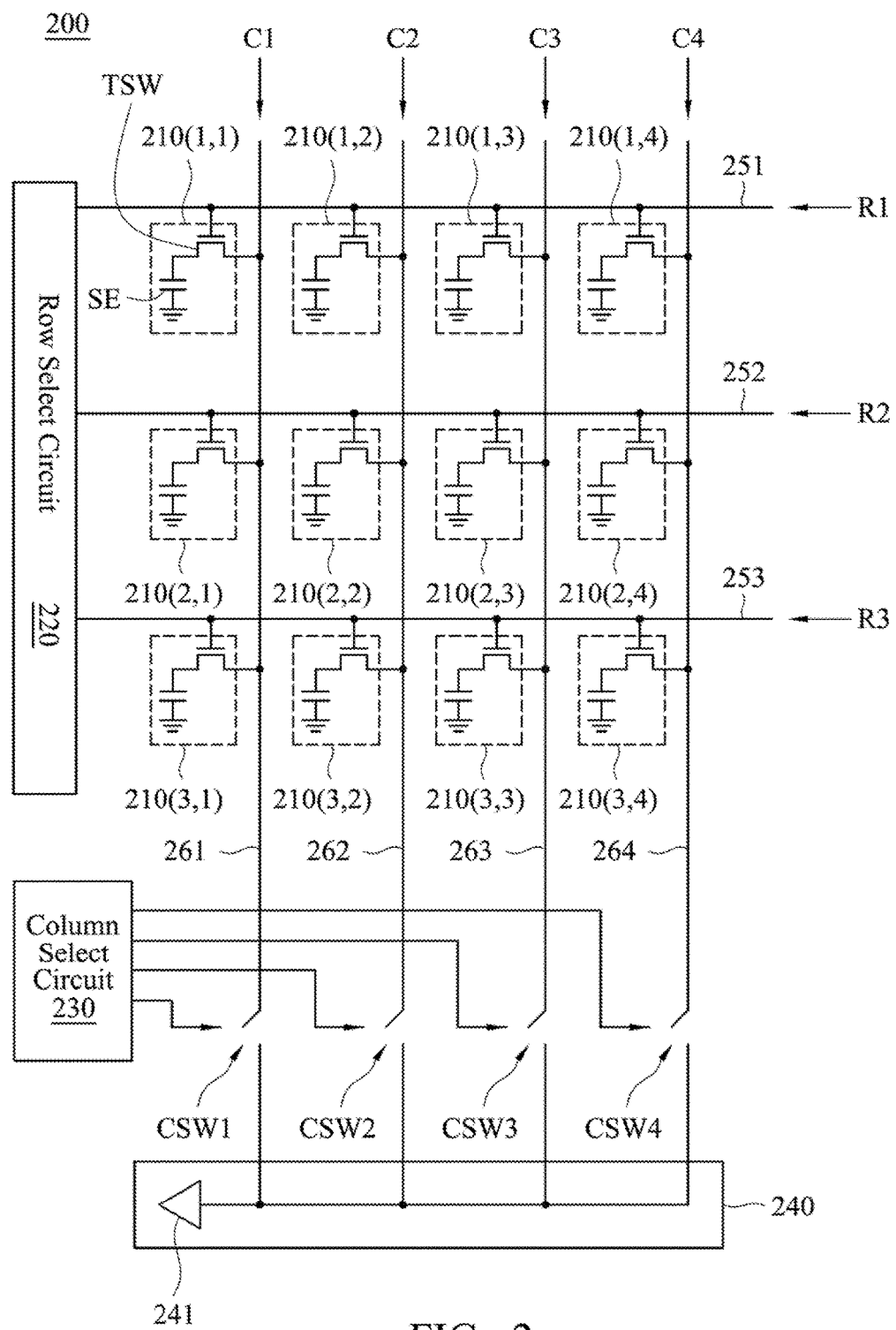
FIG. 2 is a schematic diagram illustrating a fingerprint sensing circuit according to an embodiment.

FIG. 2 is a schematic diagram illustrating a fingerprint sensing circuit according to an embodiment. Referring to FIG. 2, a fingerprint sensing circuit 200 includes multiple sensing units 210(1,1)-210(3,4), a row select circuit 220, a column select circuit 230 and a sensing circuit 240. For the sake of simplification, only 12 sensing units are illustrated in FIG. 2, but the number of the sensing units included in the fingerprint sensing circuit 200 is not limited in the invention. The sensing units 210(1,1)-210(3,4) are arranged as 4 columns C1-C4 and 3 rows R1-R3. Each of the sensing units 210(1,1)-210(3,4) includes a sensing electrode SE and a transfer switch TSW (for simplification, only sensing electrode SE and transfer switch TSW in the sensing unit 210(1,1) are labeled), and the sensing electrode SW is illustrated as a capacitor in FIG. 2. Each transfer switch TSW has a first terminal, a second terminal and a control terminal. The first terminal of the transfer switch TSW is connected to the respective sensing electrode SE. The fingerprint sensing circuit 200 further includes multiple first conductive lines 251-253 and second conductive line 261-264. The first conductive lines 251-253 are respectively corresponding to the rows R1-R3 and the second conductive lines 261-264 are respectively corresponding to the columns C1-C4. Each one of the first conductive lines 251-253 is electrically connected to the control terminals of the transfer switches TSW in the corresponding row. For example, the first conductive line 251 is electrically connected to the control terminals of the all the transfer switches TSW in the row R1, and so on. Each one of the second conductive lines 261-264 is electrically connected to the second terminals of all transfer switches TSW in the corresponding column. For example, the second conductive line 261 is electrically connected to the second terminals of all transfer switches TSW in the column C1, and so on. The first conductive lines 251-253 are connected to the row select circuit 220. The second conductive lines 261-264 are connected to the sensing circuit 240. Column switches CSW1-CSW4 are respectively disposed on the second conductive lines 261-264 and disposed between the sensing units 210(1,1)-210(3,4) and the sensing circuit 240. The column select circuit 230 is configured to turn on/off the column switches CSW1-CSW4.

Each one of the sensing units 210(1,1)-210(3,4) represents a pixel. In some embodiments, the sensing circuit 240 includes an analog to digital converter 241 for outputting a value according to the voltage on the sensing electrode SE as a grey level (referred to a fingerprint grey level below), in which the value reflects the capacitance on the sensing electrode SE, and all pixels constitute a fingerprint image. In prior art, the sensing circuit 240 is electrically connected to one sensing electrode in a sensing period to obtain one fingerprint grey level. However, in the embodiment, the sensing circuit 240 is electrically connected to the sensing units in at least two sensing units (also referred to first sensing units) in a first period to obtain one fingerprint grey level (also referred to first fingerprint grey level). For example, in the first period, the sensing circuit 240 may be electrically connected to four sensing units 210(1,1), 210(1,2), 210(2,1) and 210(2,2) to obtain one fingerprint grey level. In some embodiments, the sensing circuit 240 may be electrically connected to two sensing units 210(1,1) and 210(1,2) in the first period to obtain one fingerprint grey level. How many sensing units and which sensing units that the sensing circuit 240 is electrically connected to are not limited in the invention. In some embodiments, the sensing circuit 240 senses self-capacitance from the sensing electrodes. When the sensing circuit 240 is electrically connected to more than one sensing electrodes, the sensing electrodes are electrically connected to the each other and to the analog to digital converter 241, and thus the sensing electrodes are connected to the each other in parallel, and the area of the sensing electrode is equivalently increased, and thus the identification ability is improved.

The aforementioned first period indicates how long the generation of the fingerprint grey level is required, but the length of the first period is not limited in the invention. In some embodiments, in a second period after the first period, the sensing circuit 240 is electrically connected to the sensing electrodes in at least two sensing units (also referred to second sensing units) to obtain one fingerprint grey level (also referred to second fingerprint grey level), in which part of the second sensing units is identical to part of the first sensing units. For example, the first sensing units are 210(1,1), 210(1,2), 210(2,1) and 210(2,2), and the second sensing units are 210(1,2), 210(1,3), 210(2,2) and 210(2,3), in which the sensing units 210(1,2) and 210(2,2) are overlapped. From another aspect, in the example above, the number of the first sensing units is equal to 4, the number of the second sensing units is equal to 4. The first sensing units and the second sensing units are arranged in the first row R1 and the second row R2, the first sensing units are arranged in the first column C1 and the second column C2, and the second sensing units are arranged in the second column C2 and the third column C3.

In detail, in the first period, the row select circuit 220 transmits a first signal (e.g. high-level signal) to the first conductive lines 251 and 252 corresponding to the first row R1 and the second row R2 to turn on the transfer switches TSW in the first row R1 and the second row R2. In addition, the column select circuit 230 turns on the column switches CSW1 and CSW2 corresponding to the first column C1 and the second column C2 in the first period. Consequently, the sensing electrodes SE in the sensing units 210(1,1), 210(1,2), 210(2,1) and 210(2,2) are electrically connected to the sensing circuit 240, and the analog to digital converter 241 would output the first fingerprint grey level.

In the second period, the row select circuit 220 transmits the first signal to the first conductive lines 251 and 252 to turn on the transfer switches TSW in the first row R1 and the second row R2. In addition, the column select circuit 230 turns on the column switches CSW2 and CSW3 corresponding to the second column C2 and the third column C3. Therefore, the sensing electrodes in the sensing units 210(1,2), 210(1,3), 210(2,2) and 210(2,3) are electrically connected to the sensing circuit 240, and the analog to digital converter 241 would output the second fingerprint grey level.

In some embodiments, in a third period, the sensing circuit 240 is electrically connected to the sensing units 210(1,3), 210(1,4), 210(2,3), and 210(2,4), in a fourth period, the sensing circuit 240 is electrically connected to the sensing units 210(1,4) and 210(2,4); in a fifth period, the sensing circuit 240 is electrically connected to the sensing units 210(2,1), 210(2,2), 210(3,1) and 210(3,2). Therefore, the resolution of the fingerprint image does not change while the sensing circuit 240 uses more than one sensing units to generate one fingerprint grey level because the sensing units used in different periods are partially overlapped.

Figure 3:
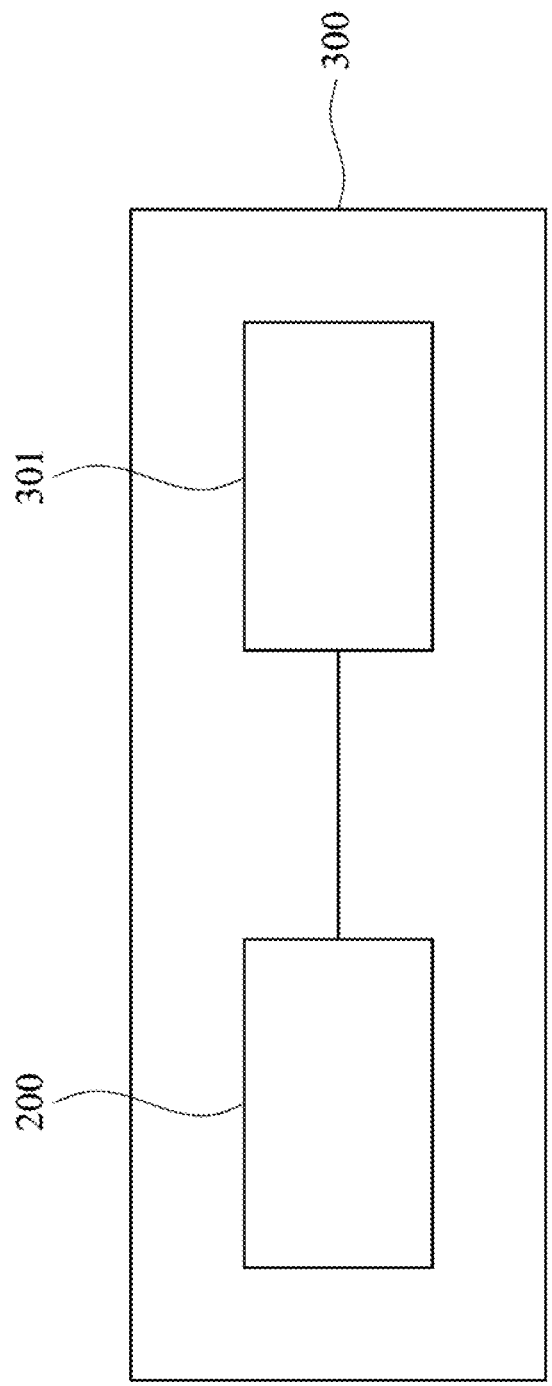
FIG. 3 is a schematic diagram illustrating an electronic device according to an embodiment.

FIG. 3 is a schematic diagram illustrating an electronic device according to an embodiment. Referring to FIG. 3, an electronic device 300 includes the aforementioned fingerprint sensing circuit 200 and a logical operation circuit 301. The electronic device 300 may be smart phone, tablet, personal computer, laptop, industry computer or any type of mobile device, which is not limited in the invention. The logical operation circuit 301 may be central processing unit, microprocessor, microcontroller, digital signal processor, image processing chip or application-specific integrated circuit, etc. Alternatively, the logical operation circuit 301 may be integrated into the fingerprint sensing circuit 200. In some embodiments, the fingerprint sensing circuit 200 operates as the embodiments described above, and the obtained fingerprint grey levels are transmitted to the logical operation circuit 301 for performing subsequent processes such as fingerprint recognition. In some embodiments, the fingerprint sensing circuit 200 obtains the fingerprint grey levels according to the approaches of prior art, that is, each fingerprint grey level is corresponding to one sensing electrode instead of multiple sensing electrodes, but the logical operation circuit 301 would perform a method for processing the fingerprint image in order to improve the identification ability.

Figure 4:
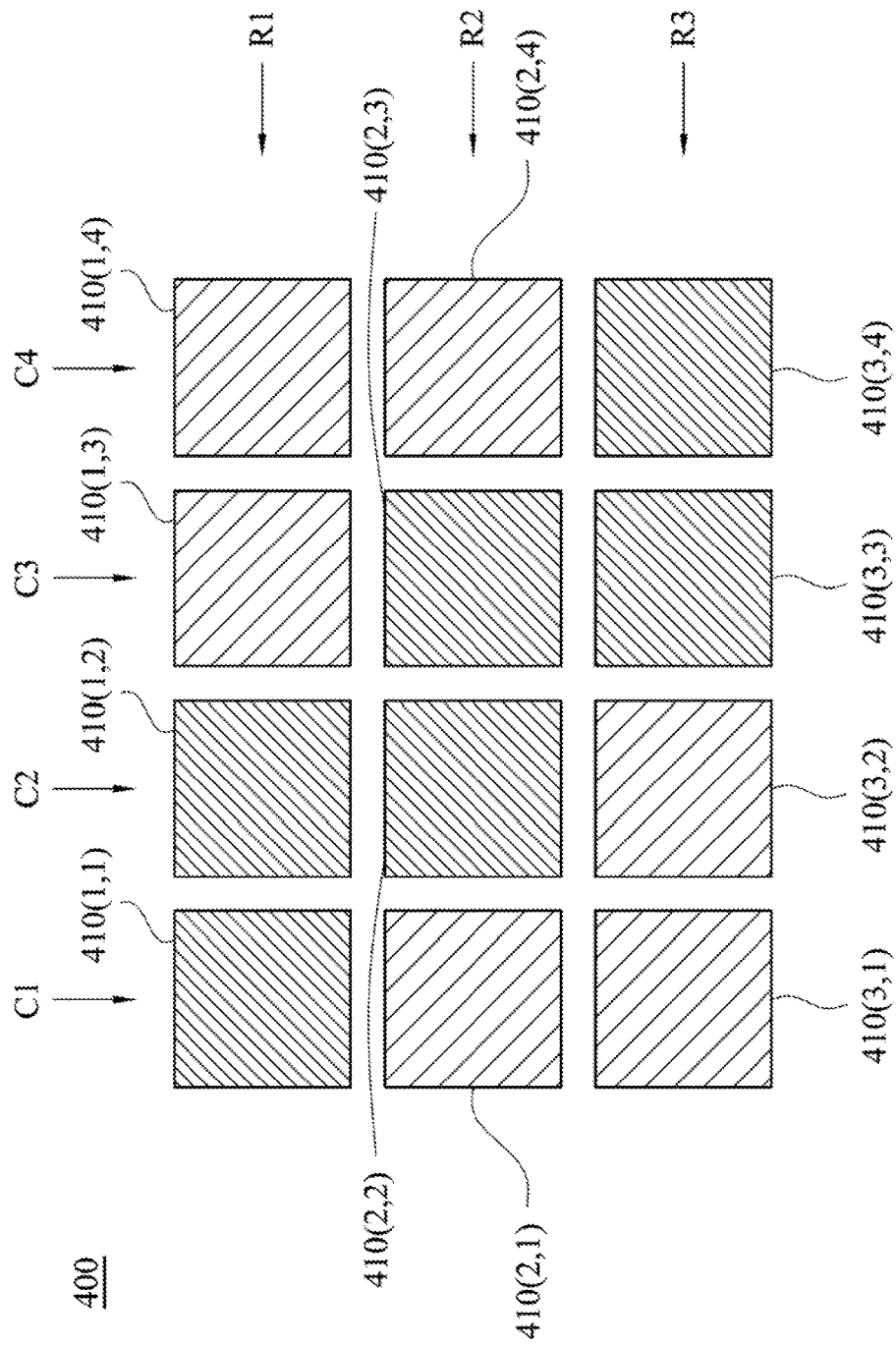
FIG. 4 is a schematic diagram illustrating the fingerprint according to an embodiment.

FIG. 4 is a schematic diagram illustrating the fingerprint image according to an embodiment. Referring to FIG. 2 to FIG. 4, a fingerprint image 400 includes fingerprint grey levels 410(1,1)-410(3,4), which are respectively corresponding to the sensing units 210(1,1)-210(3,4). In the embodiment of FIG. 4, each fingerprint grey level is obtained according to the voltage on one sensing electrode. The darker fingerprint grey levels 410(1,1), 410(1,2), 410(2,2), 410(2,3), 410(3,3) and 410(3,4) represent valleys, and the other brighter fingerprint grey levels represent ridges. In FIG. 4, the grey level difference between ridge and valley is small, and therefore it is hard to identify them. However, the logical operation circuit 301 would receive the fingerprint grey levels 410(1,1)-410(3,4), and performs weighting summation one more than one fingerprint grey levels (also referred to first fingerprint grey levels) to obtain a new fingerprint grey level (also referred to first new fingerprint grey level) to replace one original fingerprint grey level. The operation is written in a following equation (2).

$$I'_{(i,j) \in C} = \Sigma_{(m,n) \in C} w_{m,n} \times I_{m,n} \qquad (2)$$

$I'_{(i,j)}$ denotes the new fingerprint grey level at the $i^{th}$ column and $j^{th}$ row. C denotes a set including multiple coordinates, in which the coordinate (i,j) belongs to the set C. $w_{m,n}$ is a real number. $I_{m,n}$ denotes the fingerprint grey level at the $m^{th}$ column and the $n^{th}$ row. All coordinates (m,n) belong to the set C. For example, the set C includes coordinates (1,1), (1,2), (2,1), (2,2), and (i,j)=(1,1). In other words, the weighting summation is performed on the first fingerprint grey levels 410(1,1), 410(1,2), 410(2,1) and 410(2,2) to obtain a first new fingerprint grey level to replace the original fingerprint grey level 410(1,1). In some embodiments, all the weights $w_{m,n}$ are ¼, and therefore the example above calculates the mean of the first fingerprint grey levels 410(1,1), 410(1,2), 410(2,1) and 410(2,2). However, in some embodiments, all the weights $w_{m,n}$ may be 1, or the weights $w_{m,n}$ may be different from each other. For example, $w_{1,1}$ may be relatively larger than and the other weights $w_{1,2}$, $w_{2,1}$, $w_{2,2}$ due to its position. The values of the weights $w_{m,n}$ are not limited in the invention.

In some embodiments, after calculating the new fingerprint grey level 410(1,1), the logical operation circuit 301 may perform weighting summation on the fingerprint grey levels 410(1,2), 410(1,3), 410(2,2) and 410(2,3) to obtain a new fingerprint grey level to replace the fingerprint grey level 410(1,2). From another aspect, the fingerprint grey levels 410(1,2), 410(1,3), 410(2,2) and 410(2,3) may be referred to second fingerprint grey levels. Part of the second fingerprint grey levels is identical to part of the first fingerprint grey levels. That is to say, the fingerprint grey levels 410(1,2) and 410(2,2) are repeatedly used.

In the aforementioned embodiment, the weighting SU ruination is performed on 4 fingerprint grey levels to replace one original fingerprint grey level, in which 2 fingerprint grey levels are repeatedly used. But, in other embodiments, the weighting summation may be performed on N fingerprint grey levels to replace one original fingerprint grey level, in which M fingerprint grey levels are repeatedly used. N is a positive integer greater than 1, and M is a positive integer less than N. For example, in the case of N=9 and M=6, the weighting summation may be performed on the fingerprint grey levels 410(1,1), 410(1,2), 410(1,3), 410(2,1), 410(2,2), 410(2,3), 410(3,1), 410(3,2) and 410(3,3) to replace the fingerprint grey level 410(2,2); and the weighting summation is performed on the fingerprint grey levels 410(1,2), 410(1,3), 410(1,4), 410(2,2), 410(2,3), 410(2,4), 410(3,2), 410(3,3) and 410(3,4) to replace the fingerprint grey level 410(2,3).

Figure 5:
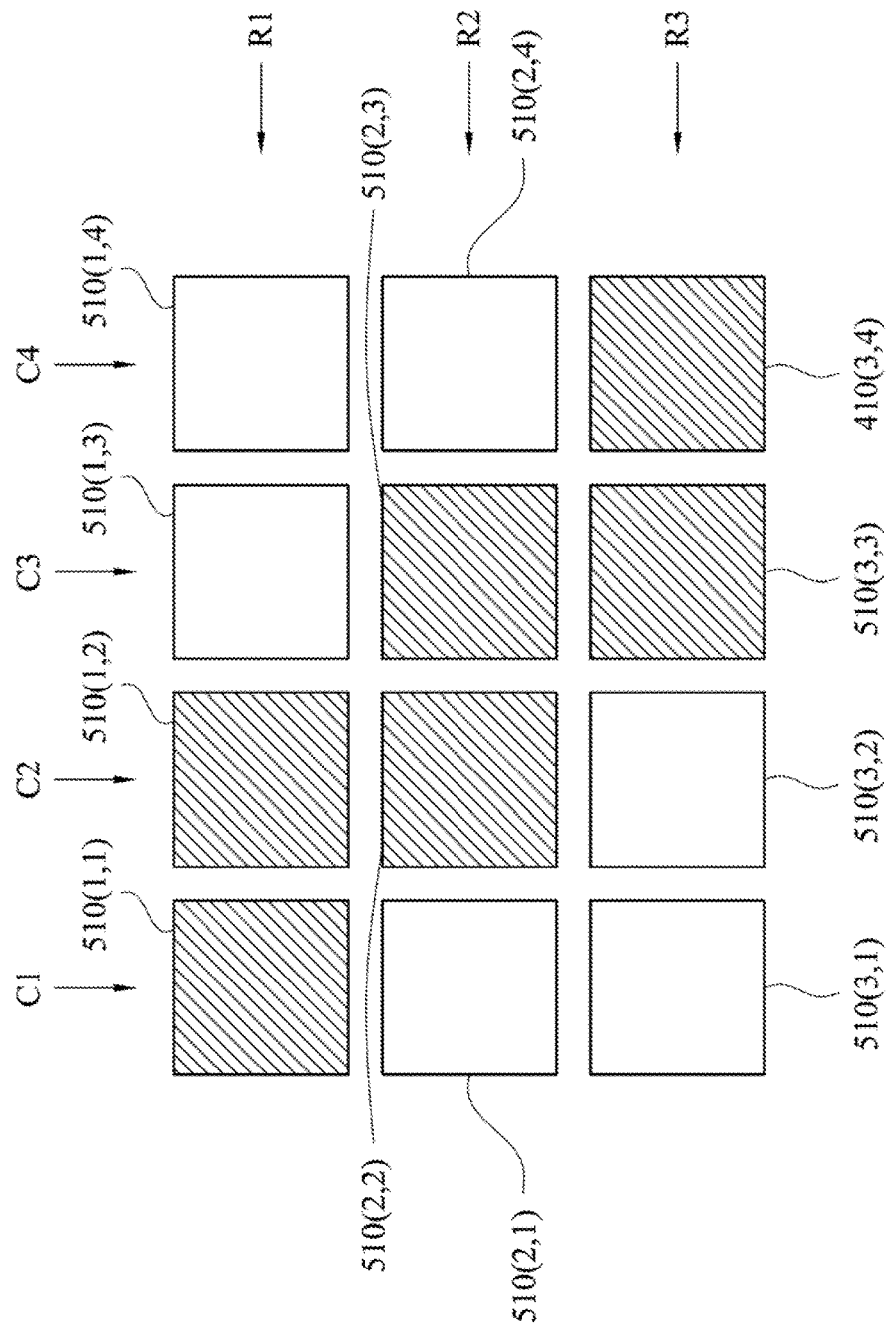
FIG. 5 is a diagram illustrating the processed fingerprint image according to an embodiment.

After the aforementioned operations are performed, a fingerprint image is generated, as shown in FIG. 5, that includes fingerprint grey levels 510(1,1)-510(3,4). The darker fingerprint grey levels 510(1,1), 510(1,2), 510(2,2), 510(2,3), 510(3,3), 510(3,4) represent valleys, and the other brighter fingerprint grey levels represent ridges. Compared to FIG. 4, the grey level difference in FIG. 5 is larger, and thus the identification ability is improved.

Figure 6:
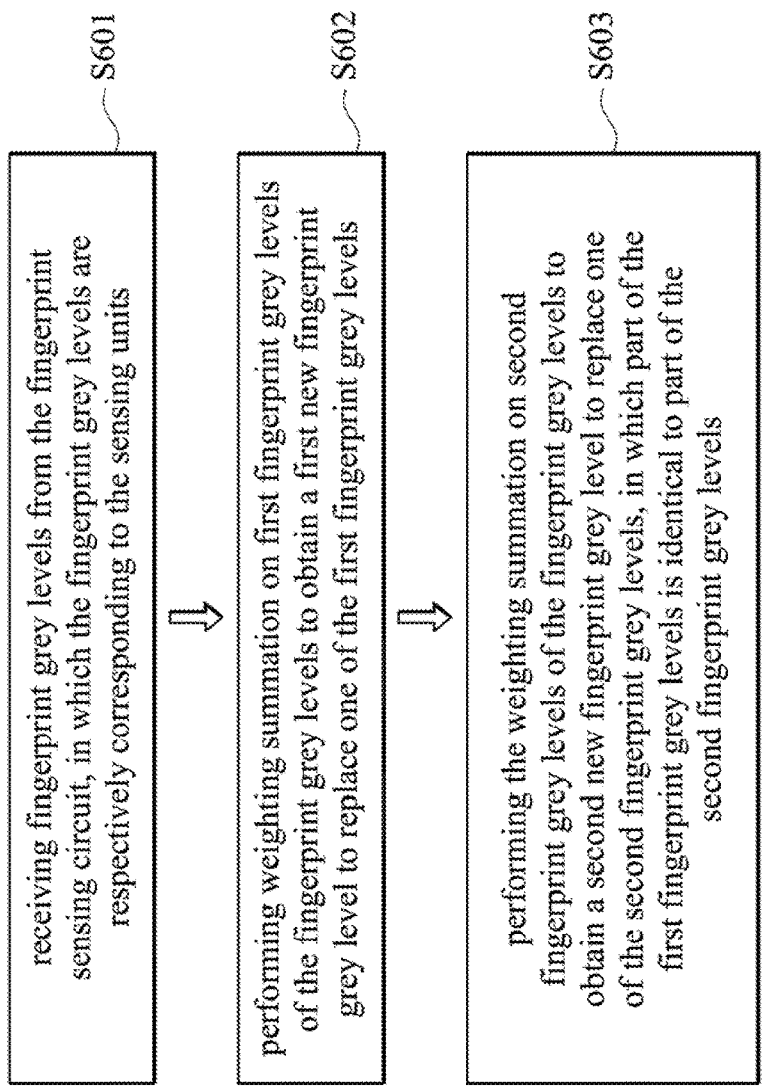
FIG. 6 is a diagram illustrating a flowchart of a method for processing fingerprint image.

FIG. 6 is a diagram illustrating a flowchart of a method for processing a fingerprint image. The method may be applied to the aforementioned fingerprint sensing circuit. Referring to FIG. 6, in step 601, fingerprint grey levels are received from the fingerprint sensing circuit. In step S602, weighting summation is performed on first fingerprint grey levels to obtain a first new fingerprint grey level to replace one of the first fingerprint grey levels. In some embodiments, the method further includes step S603, in which the weighting summation is performed on second fingerprint grey levels to obtain a second new fingerprint grey level to replace one of the second fingerprint grey levels. In particular, part of the first fingerprint grey levels is identical to part of the second fingerprint grey levels. However, all the steps in FIG. 6 have been described in detail above, and therefore the description will not be repeated.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without de parting from the scope or spirit of the invention. In view of the foregoing, it is intended that the present invention cover modifications and variations of this invention provided they fall within the scope of the following claims.

What is claimed is:

1. A fingerprint sensing circuit, comprising:
   a plurality of sensing units, arranged as a plurality of columns and a plurality of rows, wherein each of the sensing units comprises a sensing electrode and a transfer switch having a first terminal, a second terminal and a control terminal, and the first terminal of the transfer switch is connected to a respective sensing electrode;
   a sensing circuit, configured to be electrically connected to the sensing electrodes in at least two first sensing units of the sensing units in a first period to obtain a first fingerprint grey level;
   a plurality of first conductive lines respectively corresponding to the rows, wherein each of the first conductive lines is electrically connected to the control terminals of the transfer switches in one of the rows;
   a plurality of second conductive lines respectively corresponding to the columns and electrically connected to the sensing circuit, wherein each of the second conductive lines is electrically connected to the second terminals of the transfer switches in one of the columns;
   a plurality of column switches respectively disposed on the second conductive lines and disposed between the sensing units and the sensing circuit;
   a row select circuit, configured to transmit a first signal to the first conductive lines corresponding to a first row and a second row in the first period for turning on the transfer switches in the first row and the second row; and
   a column select circuit, configured to turn on the column switches corresponding to a first column and a second column in the first period,
   wherein the row select circuit is further configured to transmit the first signal to the first conductive lines corresponding to the first row and the second row in a second period to turn on the transfer switches in the first row and the second row,
   wherein the column select circuit is further configured to turn on the column switches corresponding to the second column and a third column in the second period.

2. An electronic device, comprising:
   a fingerprint sensing circuit, comprising:
      a plurality of sensing units, arranged as a plurality of columns and a plurality of rows, wherein each of the sensing units comprising a sensing electrode and a transfer switch having a first terminal, a second terminal and a control terminal, and the first terminal of the transfer switch is connected to a respective sensing electrode;
      a sensing circuit, configured to be electrically connected to the sensing electrodes in at least two first sensing units of the sensing units in a first period to obtain a first fingerprint grey level;
      a plurality of first conductive lines respectively corresponding to the rows, wherein each of the first conductive lines is electrically connected to the control terminals of the transfer switches in one of the rows;
      a plurality of second conductive lines respectively corresponding to the columns and electrically connected to the sensing circuit, wherein each of the second conductive lines is electrically connected to the second terminals of the transfer switches in one of the columns;
      a plurality of column switches respectively disposed on the second conductive lines, and disposed between the sensing units and the sensing circuit;
      a row select circuit, configured to transmit a first signal to the first conductive lines corresponding to a first row and a second row in the first period for turning on the transfer switches in the first row and the second row; and
a column select circuit, configured to turn on the column switches corresponding to a first column and a second column in the first period,
wherein the row select circuit is further configured to transmit the first signal to the first conductive lines corresponding to the first row and the second row in a second period to turn on the transfer switches in the first row and the second row,
wherein the column select circuit is further configured to turn on the column switches corresponding to the second column and a third column in the second period.

* * * * *